(12) United States Patent
Prakash et al.

(10) Patent No.: US 8,195,146 B2
(45) Date of Patent: Jun. 5, 2012

(54) REMOTE MANAGEMENT OVER A WIRELESS WIDE-AREA NETWORK USING SHORT MESSAGE SERVICE

(75) Inventors: Gyan Prakash, Beaverton, OR (US);
Farid Adrangi, Lake Oswego, OR (US);
Selim Aissi, Beaverton, OR (US);
Hormuzd Khosravi, Portland, OR (US);
Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 12/645,948

(22) Filed: Dec. 23, 2009

(65) Prior Publication Data

US 2011/0151854 A1  Jun. 23, 2011

(51) Int. Cl.
*H04M 3/00* (2006.01)
(52) U.S. Cl. ........ 455/420; 455/419; 455/557; 455/574; 455/466; 455/426.1
(58) Field of Classification Search .................. 455/419, 455/466, 425, 426.1, 456.6, 575, 574; 370/338
See application file for complete search history.

(56) References Cited

U.S. PATENT DOCUMENTS

| | | | | |
|---|---|---|---|---|
| 7,620,407 | B1 * | 11/2009 | Donald et al. ................ | 455/466 |
| 2004/0067761 | A1 * | 4/2004 | Pyhalammi et al. .......... | 455/466 |
| 2004/0180702 | A1 | 9/2004 | Hughes | |
| 2005/0085245 | A1 | 4/2005 | Danneels | |
| 2007/0140199 | A1 * | 6/2007 | Zhao et al. ................... | 370/338 |
| 2007/0162582 | A1 | 7/2007 | Belali et al. | |
| 2011/0014933 | A1 * | 1/2011 | Karmarkar et al. .......... | 455/466 |

FOREIGN PATENT DOCUMENTS

EP  1973026 A1  9/2008

OTHER PUBLICATIONS

Extended European Search Report received for European Patent Application No. 10196886.5, mailed on Apr. 8, 2011, 8 pages.
"The All New 2010 Intel Core vPro Processor Family: Intelligence that Adapts to Your Needs," available at http://download.intel.com/products/vpro/whitepaper/crossclient.pdf, 2010, 28 pgs., USA.
"Architecture Guide: Intel Active Management Technology," Architecture Guide: Intel Active Management Technology—Intel Software Network, available at http://software.intel.com/en-us/articles/architecture-guide-intel-active-management-technology/, accessed May 9, 2010, 18 pgs.
"Intel Active Management Technology," Wikipedia, the free encyclopedia, available at http://en.wikipedia.org/wiki/Intel_Active_Management_Technology, accessed May 9, 2010, 10 pgs.

(Continued)

*Primary Examiner* — David Q Nguyen
(74) *Attorney, Agent, or Firm* — Barnes & Thornburg LLP

(57) ABSTRACT

A method and device for remote management over a wireless wide-area network includes receiving a short message over a wireless wide-area network (WWAN) using an out-of-band (OOB) processor of a computing device. The OOB processor is capable of communicating over the WWAN irrespective of an operational state of an in-band processor of the computing device. The computing device executes at least one operation with the OOB processor in response to receiving the short message.

20 Claims, 3 Drawing Sheets

OTHER PUBLICATIONS

"Intel vPro," Wikipedia, the free encyclopedia, available at http://en.wikipedia.org/wiki/Intel_vPro, accessed May 9, 2010, 8 pgs.

"Intel Active Management Technology Setup and Configuration Service Version 5.0—Console User's Guide," available at http://cache-www.intel.com/cd/00/00/32/09/320963_320963.pdf, Jul. 9, 2008, 163 pgs.

"Short message service center," Wikipedia, the free encyclopedia, available at http://en.wikipedia.org/wiki/Short_message_service_center, accessed May 9, 2010, 2 pgs.

"Mobile Application Part," Wikipedia, the free encyclopedia, available at http://en.wikipedia.org/wiki/Mobile_application_part, accessed May 9, 2010, 2 pgs.

"International Mobile Equipment Identity," Wikipedia, the free encyclopedia, available at http://en.wikipedia.org/wiki/IMEI, accessed May 9, 2010, 2 pgs.

"Subscriber Identity Module," Wikipedia, the free encyclopedia, available at http://en.wikipedia.org/wiki/Subscriber_Identity_Module, accessed May 9, 2010, 9 pgs.

"GSM," Wikipedia, the free encyclopedia, available at http://en.wikipedia.org/wiki/GSM, accessed May 9, 2010, 7 pgs.

"SMS," Wikipedia, the free encyclopedia, available at http://en.wikipedia.org/wiki/SMS, accessed May 9, 2010, 9 pgs.

* cited by examiner

REMOTE MANAGEMENT OVER A WIRELESS WIDE-AREA NETWORK USING SHORT MESSAGE SERVICE

BACKGROUND

A wide-area network (WAN) is a communications network which covers a relatively large geographic area, as compared to a local-area network (LAN). A wireless wide-area network (WWAN) typically employs a cellular radio network to provide wireless communications, possibly on a citywide or even nationwide basis. One illustrative embodiment of a WWAN is a telecommunications network configured according to the GSM (Groupe Spécial Mobile) standard. The GSM standard uses digital channels for both speech and data and, thus, has been referred to as a second generation (2 G) mobile telephony system. Third generation (3 G) and fourth generation (4 G) versions of GSM networks allow simultaneous use of speech and data services and higher data rates than 2 G networks. One feature of the GSM standard is the Subscriber Identity Module (SIM), commonly known as a SIM card. A SIM is a detachable smart card that stores an International Mobile Equipment Identity (IMEI) that uniquely identifies the phone or computing device on the GSM network.

Although optimized for telephony, the GSM standard introduced Short Message Service (SMS), or "text messaging," as an alternate mode of communication between devices on the WWAN. The SMS protocol allows for a "short message" consisting of 140 bytes of data, plus headers and routing information, to be sent over the GSM network. Longer "short messages" may be sent by concatenating several messages together. SMS is realized in modern WWANs by use of the Mobile Application Part (MAP) of the SS7 protocol. A Short Message Service Center (SMSC) is a network element in the WWAN that receives, stores, and forwards (delivers) short messages between user devices on the network.

BRIEF DESCRIPTION OF THE DRAWINGS

The systems, devices, and methods described herein are illustrated by way of example, and not by way of limitation, in the accompanying figures. For simplicity and clarity of illustration, elements illustrated in the figures are not necessarily drawn to scale. For example, the dimensions of some elements may be exaggerated relative to other elements for clarity. In the following figures.

DETAILED DESCRIPTION OF THE DRAWINGS

Figure 1:
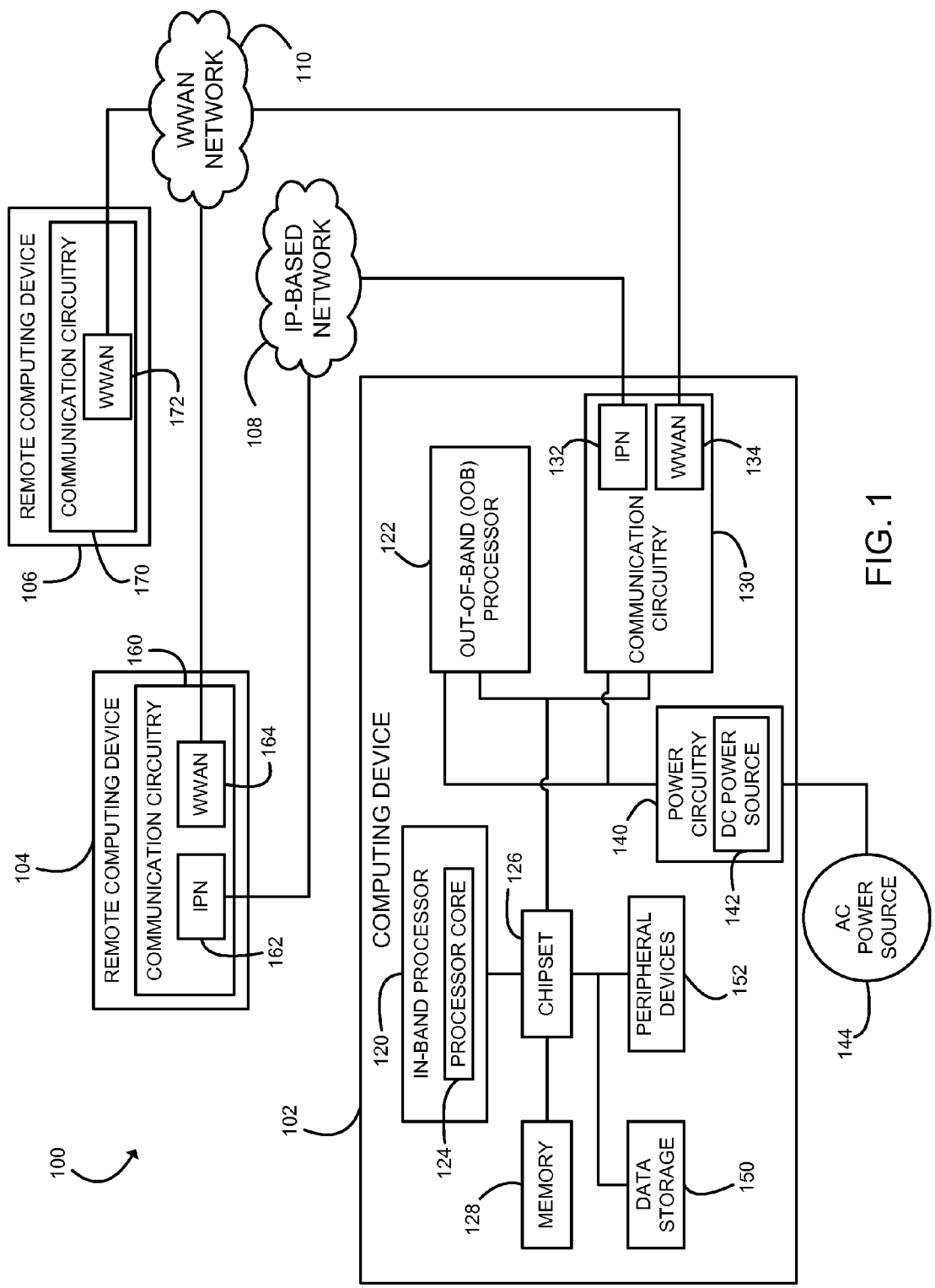
FIG. 1 is a simplified block diagram of one embodiment of a system configured to provide remote management over a wireless wide-area network.

While the concepts of the present disclosure are susceptible to various modifications and alternative forms, specific exemplary embodiments thereof have been shown by way of example in the drawings and will be herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits, and full software instruction sequences may have not been shown in detail in order not to obscure the disclosure. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure may be implemented in hardware, firmware, software, or any combination thereof. Embodiments of the disclosure implemented in a computer system may include one or more bus-based interconnects between components and/or one or more point-to-point interconnects between components. Embodiments of the invention may also be implemented as instructions stored on a machine-readable, tangible medium, which may be read and executed by one or more processors. A machine-readable, tangible medium may include any tangible mechanism for storing or transmitting information in a form readable by a machine (e.g., a computing device). For example, a machine-readable, tangible medium may include read only memory (ROM); random access memory (RAM); magnetic disk storage media; optical storage media; flash memory devices; and other tangible mediums.

Referring now to FIG. 1, a system 100 configured to provide remote management over a wireless wide-area network (WWAN) using short messages includes a computing device 102, a remote computing device 104, and a WWAN 110 that communicatively couples the computing device 102 to the remote computing device 104. In some embodiments, the system 100 may include an Internet Protocol (IP) based network (IPN) 108 that also communicatively couples the computing device 102 to the remote computing device 104. In other embodiments, the system 100 may further include another remote computing device 106 connected, via the WWAN 110, to the computing device 102. Additional remote computing devices (not shown) may communicate with the computing device 102 over either or both of the IPN 108 and the WWAN 110.

The computing device 102 may be embodied as any type of electronic device capable of performing the functions described herein. For example, the computing device 102 may be embodied as a personal computer, a workstation, a laptop computer, a handheld computer, a mobile internet device, a cellular phone, a personal data assistant, a telephony device, a network appliance, a virtualization device, a storage controller, or other computer-based device.

The computing device 102 includes an in-band processor 120, an out-of-band (OOB) processor 122, a chipset 126, a memory 128, communication circuitry 130, and power circuitry 140. In some embodiments, the computing device 102 may also include one or more data storage devices 150 and/or one or more additional peripheral devices 152. In some illustrative embodiments, several of the foregoing components may be incorporated on a motherboard of the computing device 102, while other components may be communicatively coupled to the motherboard via, for example, a peripheral port. Furthermore, it should be appreciated that the computing device 102 may include other components, sub-components, and devices commonly found in a computer and/or computing device, which are not illustrated in FIG. 1 for clarity of the description.

The in-band processor 120 of the computing device 102 may be any type of processor capable of executing software/firmware, such as a microprocessor, digital signal processor, microcontroller, or the like. The in-band processor 120 is illustratively embodied as a single core processor having a processor core 124. However, in other embodiments, the in-band processor 120 may be embodied as a multi-core processor having multiple processor cores 124. Additionally, the computing device 102 may include additional in-band processors 120 having one or more processor cores 124. The in-band processor 120 is generally responsible for executing a software stack, which may include an operating system and various applications, programs, libraries, and drivers resident on the computing device 102.

The chipset 126 of the computing device 102 may include a memory controller hub (MCH or "northbridge"), an input/output controller hub (ICH or "southbridge"), and a firmware device. In such embodiments, the firmware device may be embodied as a memory storage device for storing Basic Input/Output System (BIOS) data and/or instructions and/or other information. However, in other embodiments, chipsets having other configurations may be used. For example, in some embodiments, the chipset 126 may be embodied as a platform controller hub (PCH). In such embodiments, the memory controller hub (MCH) may be incorporated in or otherwise associated with the in-band processor 120.

The chipset 126 is communicatively coupled to the in-band processor 120 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like.

The memory 128 of the computing device 102 is also communicatively coupled to the chipset 126 via a number of signal paths. The memory 128 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single memory device 128 is illustrated in FIG. 1, in other embodiments, the computing device 102 may include additional memory devices. The operating system, applications, programs, libraries, and drivers that make up the software stack executed by the in-band processor 120 may reside in memory 128 during execution. Furthermore, software and data stored in memory 128 may be swapped between memory 128 and one or more data storage devices 150 as part of memory management operations.

The communication circuitry 130 of the computing device 102 may be embodied as any number of devices and circuitry for enabling communications between the computing device 102 and one or more remote devices (such as remote computing devices 104, 106) over the IPN 108 and/or the WWAN 110. For example, communication circuitry 130 includes a wireless network interface 134 for facilitating communications over the WWAN 110. The wireless network interface 134 may be illustratively embodied as a GSM, 3 G, or 4 G modem having a wireless transceiver. In such embodiments, the wireless modem 134 will include a SIM card (not shown) with an International Mobile Equipment Identity (IMEI) that uniquely identifies the computing device 102 on the WWAN 110. Among other types of communications, the wireless modem 134 allows the computing device 102 to send and receive short messages according to an SMS protocol over the WWAN 110. In some embodiments, the communication circuitry 130 may also include one or more wired or wireless network interfaces 132 to facilitate IP-based wired and/or wireless communications over the IPN 108. Communication circuitry 130 is also communicatively coupled to the chipset 126 via a number of signal paths, allowing the in-band processor 120 to access the networks 108, 110.

The components of computing device 102, including in-band processor 120, chipset 126, memory 128, and communication circuitry 130, are also operably coupled to power circuitry 140. The power circuitry 140 may be embodied as a circuit capable of drawing power from an AC commercial power source 144, a DC battery power source 142, or both. To conserve energy, the computing device 102 may be placed in several reduced-power operational states when not being actively used. For example, the computing device 102 may be placed in a powered down or "off" state in which few, if any, components of the computing device 102 receive power from the power circuitry 140. Alternatively, the computing device 102 may be placed into various "sleep" or "hibernate" states in which some, but not all, components of computing device 102 receive power from the power circuitry 140. For instance, a "sleep" state may provide power to a volatile memory 128 (in order to retain data) but not to the in-band processor 120. Such a reduced-power operational state conserves energy while allowing the computing device 102 to return quickly to a full-power operational state.

The out-of-band (OOB) processor 122 is distinct from and generally operates independently of the in-band processor 120. The OOB processor 122 may also be embodied as any type of processor capable of executing software, such as a microprocessor, digital signal processor, microcontroller, or the like, including one or more processors having one or more processor cores (not shown). The OOB processor 122 may be integrated into the chipset 126 on the motherboard or may be embodied as one or more separate integrated circuits disposed on an expansion board that is communicatively coupled to the chipset 126 via a number of signal paths. The OOB processor 122 may also be communicatively coupled to various components of the computing device 102, such as the memory 128 and the communication circuitry 130, via a number of signal paths. Alternatively or additionally, the OOB processor 122 may include built-in components with similar functionality, such as a dedicated memory and/or dedicated communication circuitry (not shown).

The OOB processor 122 is configured for managing particular functions of the computing device 102 irrespective of the operational state of the in-band processor 120. To facilitate such independent operation, the OOB processor 122 may be provided with an independent connection to the power circuitry 140, allowing the OOB processor 122 to retain power even when other components of the computing device 102 are powered down or turned off. Furthermore, the OOB processor 122 may be provided with one or more independent network interfaces via communication circuitry 130, which is also provided with an independent connection to the power circuitry 140, allowing out-of-band communications over the IPN 108 and/or the WWAN 110. In other words, the OOB processor 122 is able to communicate directly with devices on the networks 108, 110 (such as remote computing devices 104, 106), outside of the operating system running on in-band processor 120. In fact, this communication may take place without the user's knowledge. The OOB processor 122 is also capable of causing the computing device 102 to return to a full-power operational state, including booting the operating system. In summary, the OOB processor 122 may operate intelligently based on incoming queries/commands and communicate across the networks 108, 110 whether the in-band processor 120 is turned off, running on standby, being initialized, or in regular operation and whether the operating system is booting, running, crashed, or otherwise.

In some illustrative embodiments, the OOB processor 122 may be implemented using Intel® Active Management Technology (Intel® AMT), using a portion of Intel® AMT, or using an Intel® Management Engine (Intel® ME), all available from Intel Corporation of Santa Clara, Calif., and/or within chipsets sold by Intel Corporation. Intel AMT® embedded platform technology enables out-of-band access to hardware and software information stored in non-volatile memory on each endpoint device, eliminating the need for a functioning operating system and many of the software agents found in other management tools.

As discussed above, the computing device 102 may also include one or more data storage devices 150 and one or more peripheral devices 152. In such embodiments, the chipset 126 is also communicatively coupled to the one or more data storage devices 150 and the one or more peripheral devices 152 via a number of signal paths. The data storage device(s) 150 may be embodied as any type of device configured for the short-term or long-term storage of data such as, for example, memory devices and circuits, memory cards, hard disk drives, solid-state drives, or other data storage devices. The peripheral device(s) 152 may include any number of peripheral devices including input devices, output devices, and other interface devices. For example, the peripheral devices 152 may include a display, a mouse, a keyboard, and/or one or more external speakers of the computing device 102. The particular devices included in the peripheral devices 152 may depend upon, for example, the intended use of the computing device.

The IPN 108 is embodied as, or otherwise include, any number of wired and/or wireless IP-based communications networks such as IP-based local area networks (LAN), IP-based wide area networks (WAN), and/or publicly available global networks (e.g., the Internet). Additionally, the IPN 108 may include any number of additional devices to facilitate communication between the computing device 102 and the remote computing device 104, such as routers, switches, intervening computers, and the like.

As described above, the WWAN 110 is a wireless wide-area network that covers a relatively large geographic area and uses mobile telecommunication cellular network technologies to communicate data. For example, in some embodiments, WWAN 110 may be a cellular radio network configured according to the GSM (Groupe Special Mobile), 3 G, or 4 G standard. In such embodiments, the WWAN 110 includes a Short Message Service Center (not shown) which is configured to receive, store, and forward (deliver) short messages between computing device 102 and remote computing devices 104, 106. Additionally, the WWAN 110 may include any number of additional devices to facilitate communication between the computing device 102 and the remote computing devices 104, 106, such as routers, switches, intervening computers, and the like The remote computing devices 104, 106 may be embodied as any type of computing devices separate from the computing device 102. For example, the remote computing devices 104, 106 may be embodied as one or more personal computers, workstations, laptop computers, handheld computers, mobile internet devices, cellular phones, personal data assistants, telephony devices, network appliances, virtualization devices, storage controllers, or other computer-based devices also configured to communicate with the computing device 102 over the networks 108, 110. The remote computing devices 104, 106 may each have a similar configuration to that of the computing device 102, including communication circuitry 160, 170. Some remote computing devices 104 may have communication circuitry 160 that includes both an IPN interface 162 and a WWAN interface 164, while other remote computing devices 106 may have communication circuitry 170 that includes only a WWAN interface 172.

Figure 2:
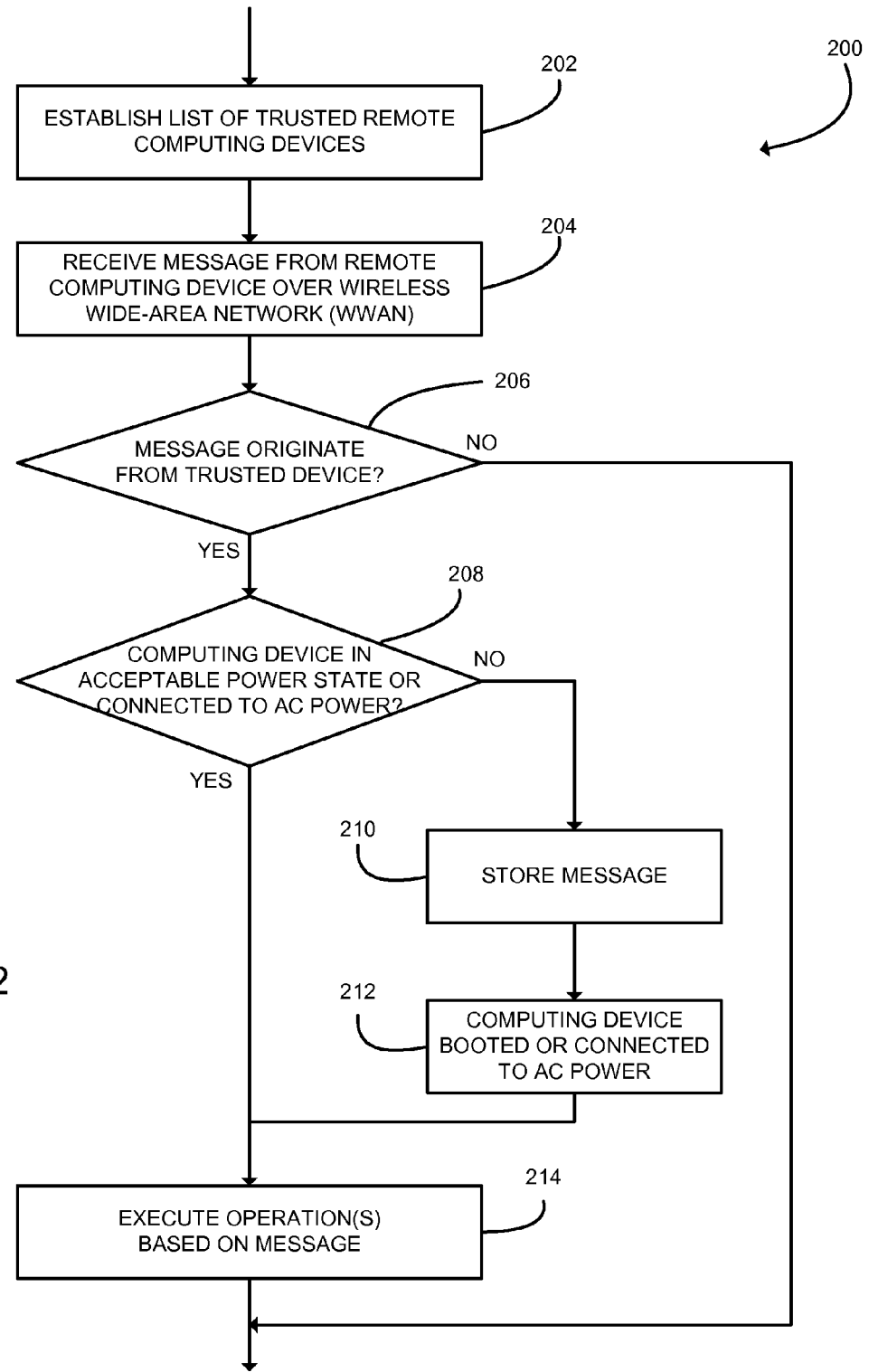
FIG. 2 is a simplified flow diagram of one embodiment of a method for providing remote management over a wireless wide-area network used by the system of FIG. 1.

Several of the features of OOB processor 122, including its persistent power circuitry 140 and independent communication channel, allow the system 100 to provide remote management over the WWAN 110 using short messages. To do so, as illustrated in FIG. 2, the computing device 102 may be configured to execute a method 200 for providing remote management over the WWAN 110. The method 200 may be executed by, for example, the OOB processor 122, in conjunction with other components of the computing device 102, which may interact with other components of the system 100. The method 200 may allow remote management of the computing device 102 for any purpose, including, but not limited to, operating system management, software patches, anti-virus updates, secure file/folder access, platform feature access, asset management, and/or anti-theft protection.

The method 200 begins with block 202 in which the computing device 102 establishes a list of trusted remote computing devices. The OOB processor 122 will not execute the operations requested by a short message unless the originating device is on the list of trusted devices. This requirement of a preexisting trust relationship prevents the inadvertent execution of malicious software by the OOB processor 122 due to a short message received from a non-trusted party. For the following description, the remote computing device 104 will illustratively be considered a "trusted" device, while the remote computing device 106 will illustratively be considered a "non-trusted" device.

In block 202, the computing device 102 places the trusted remote computing device 104 on its list of trusted devices. The trust relationship may be established in several ways. In some embodiments (where at least one device is portable), the computing devices 102, 104 could be brought within four centimeters of one another to communicate via near field communication (NFC) to establish a trust relationship. In other embodiments, a centralized server, such as an AMT/Anti-Theft Server could provision a shared secret protocol (symmetry key) between the computing devices 102, 104 during service activations for added security. In still other embodiments, the user of computing device 102 may register a trusted remote computing device 104, such as his smart phone, to have remote management capabilities. Many other possibilities for establishing the trust relationship exist and will be apparent to persons of ordinary skill in the art. In each case, the list of trusted devices stored on the computing device 102 will have identification data, which may be used to identify uniquely the source of a short message, such as the trusted parties' International Mobile Equipment Identities (IMEI).

In block 204, OOB processor 122 receives a short message over the WWAN 110. This short message may originate from one of the remote computing devices 104, 106 and is directed to the computing device 102 by a SMS Center on the WWAN 110 (using the phone number, or other unique ID, assigned to the computing device 102). It should be noted that the short message may be sent to the OOB processor 122 via the WWAN 110 even if the remote computing device does not know an internet protocol (IP) address of the computing device 102. In other words, a short message may be sent directly to the computing device 102 even from outside a security measure, such as a firewall, hiding the IP address of computing device 102 from the remote computing devices 104, 106. It should also be appreciated that the OOB processor 122, due to its persistent power circuitry 140 and "always-on" communication channel to WWAN 110 through wireless network interface 134, is available to receive a short message even when the in-band processor 120 of the computing device 102 is in a reduced power state or turned off.

After the short message is received in block 204, the OOB processor 122 determines if the message originated from a trusted device in block 206. Each short message that is received by the OOB processor 122 includes sender information embedded in associated routing information, which is typically included in a header of the short message. The OOB processor 122 may verify the sender information against the list of trusted remote computing devices established in block 202. If the short message did not originate from a trusted device, the OOB processor 122 will not attempt to execute any instructions contained in the message (i.e., blocks 208-214 are skipped). Rather, the OOB processor 122 may delete, store, or forward the short message, as appropriate.

However, if the short message is determined to have originated from a trusted device, the method 200 proceeds to block 208 in which the OOB processor 122 determines the current operational state of the computing device 102. In particular, the OOB processor 122 will evaluate whether the in-band processor 120 is in a full-power operational state or whether the power circuitry 140 is connected to an AC commercial power source 144. If either of these conditions is satisfied, the OOB processor 122 will execute, in block 214, one or more operations based on or otherwise indicated by the received short message as discussed in more detail below in regard to FIG. 3.

However, if the in-band processor 120 is in a reduced-power operational state and the computing device 102 is operating solely on the DC battery power source 142, the method 200 will proceed to block 210 in which the short message is stored in memory, rather than immediately executed by the OOB processor 122. In this way, inadvertent draining of any remaining power in the DC battery power source 142 is prevented. That is, if the user has placed the in-band processor in a reduced-power operational state (such as "off" or "hibernate") and the AC commercial power source 144 is unavailable, the computing device 102 will not immediately perform the operation indicated by the short message so as not to drain the remaining power of the device 102. As such, the remaining power of the DC battery power source 142 is saved for the continued operation of the OOB processor 122 and wireless network interface 134. The execution of the method 200 holds in block 210 until the computing device 102 is either booted from its reduced-power operational state by the user or the computing device 102 is connected to an AC commercial power source 144, as indicated in block 212. Once one of the conditions of block 212 is satisfied, the method 200 proceeds to block 214.

Once the computing device 102 is connected to the AC commercial power source 144 or booted to a full-power operation state, the method 200 proceeds to block 214 in which the OOB processor 122 executes one or more operations based on or otherwise indicated by the content of the short message received from the trusted remote computing device 104. The short message may include the direct instructions, functions, or procedures to be executed by the computing device 102 or may include other data from which the computing device 102 determines one or more instructions, functions, or procedures to be executed (e.g., based on a look-up table). As such, the instructions for the OOB processor 122 contained in the short message may be encoded using any suitable methodology within the size limits of the short message (e.g., 140 bytes of data per short message). The short message may instruct the OOB processor 122 to perform one or multiple operations including, for example, booting the in-band processor 120 from a reduced-power operational state, installing a software patch or anti-virus update, or blocking all network ports until a threat is addressed. Of course, in other embodiments, the short message may instruct the OOB processor 122 to perform other operations based on the particular implementation.

Figure 3:
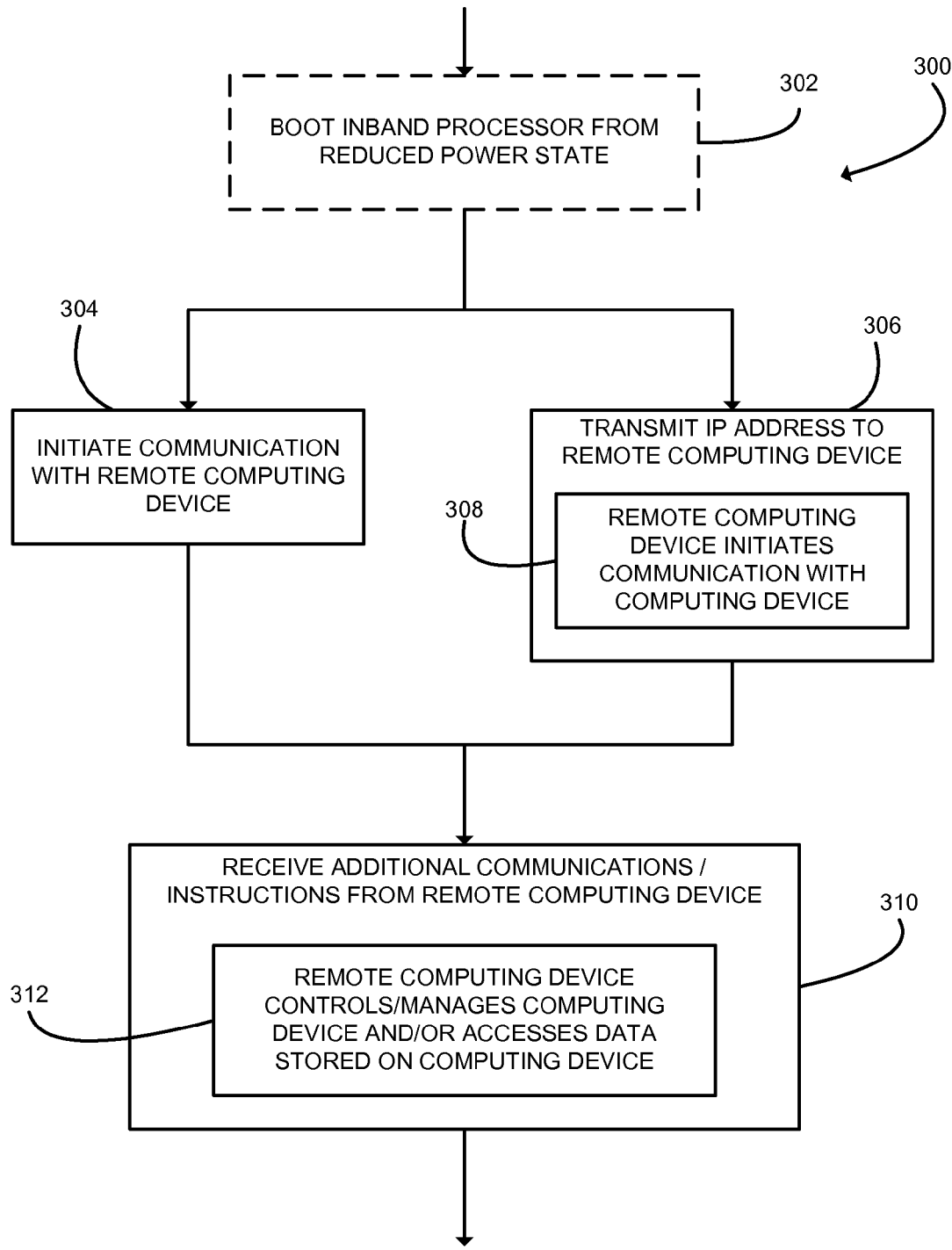
FIG. 3 is a simplified flow diagram of one embodiment of a method for executing one or more operations based on a short message received during the method of FIG. 2.

Referring now to FIG. 3, the OOB processor 122 may execute a method 300 for performing one or more operations in block 214 of the method 200. The method 300 illustrates an embodiment of operations that may be performed by the OOB processor 122 wherein the short message is configured to establish a secure connection between the computing device 102 and the remote computing device 104. Such a secure connection could be used for file/folder access, feature access, remote diagnosis, and troubleshooting of the computing device 102 by the remote computing device 104, among other possible uses. For example, in one particular embodiment, the secure connection is established between the computing device 102 and the remote computing device 104 through a firewall, which may be protecting the computing device 102.

In some embodiments, the method 300 begins with block 302 in which the OOB processor 122 boots the in-band processor 120 from a reduced-power operational state. The short message may instruct the OOB processor 122 to do so in embodiments in which some or all of the remaining operations to be performed require the participation of the in-band processor 120. Of course, in some situations, the in-band processor 120 may already be in a full-power operational state and does not require booting. In other embodiments, the in-band processor 120 may not be required to perform the operations and, as such, is not booted from a reduced-power operational state.

After the in-band processor 120 has been booted in block 302, if needed, the method 300 proceeds to either block 304 or block 306, depending on the content of the received short message. For example, in block 304, the short message instructs the computing device 102 to initiate a secure communication connection between the device 102 and the remote computing device 104. To do so, in some embodiments, the OOB processor 122 communicates over the WWAN 110 using wireless network interface 134. However, in other embodiments, the short message may contain the IP address of the remote computing device 104. In such embodiments, the OOB processor 122 may initiate communications with the remote computing device 104 over the IPN 108 using network interface 132. Regardless, however, it should be appreciated that in each embodiment the remote computing device 104 does not need to know the IP address of the computing device 102 in advance.

Alternatively, the short message may instruct the computing device 102 to transmit the IP address of the device 102 in block 306. If so, the OOB processor 122 transmits the IP address of the computing device 102 to the remote computing device 104 over the WWAN 110 using wireless network interface 134. In response, the remote computing device 104 may initiate the secure communication connection with the computing device 102 in block 308. In some embodiments, the OOB processor 122 may receive communications from the remote computing device 104 over the IPN 108 using network interface 132 in block 308. In other embodiments, the OOB processor 122 may receive communications from the remote computing device 104 over the WWAN 110 using wireless network interface 134 in block 308.

After a secure connection has been initiated between the computing device 102 and the remote computing device 104 (in block 304 or block 306), the method 300 proceeds to block 310 in which the OOB processor 122 receives additional communications (and possibly further instructions) from the remote computing device 104 over either the IPN 108 or the WWAN 110, depending on which method of communication was used to establish the secure connection. As such, in block 312, the remote computing device 104 may utilize the secure connection to control and/or manage the computing device 102, as well as data stored on the computing device 102. The remote computing device 104 may continue to do so until the communication session has ended.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure and the appended claims are desired to be protected.

The invention claimed is:

1. A method comprising:
receiving a short message over a wireless wide-area network (WWAN) using an out-of-band (OOB) processor of a computing device, the OOB processor being capable of communicating over the WWAN irrespective of an operational state of an in-band processor of the computing device;
determining whether the in-band processor is in a full-power operational state and whether the computing device is connected to an external power source in response to receiving the short message; and
executing at least one operation with the OOB processor indicated by the short message in response to determining that the in-band processor is in the full-power operational state or in response to determining that the computing device is connected to the external power source.

2. The method of claim 1, wherein receiving the short message comprises receiving a short message from a short message service center over a GSM cellular network.

3. The method of claim 1, wherein receiving the short message comprises receiving a short message that originated from a remote computing device outside of a firewall protecting the computing device having the OOB processor.

4. The method of claim 3, wherein executing at least one operation with the OOB processor comprises establishing a secure connection, through the firewall, between the remote computing device and the computing device having the OOB processor.

5. The method of claim 3, further comprising:
establishing a list of trusted remote computing devices; and
executing at least one operation with the OOB processor indicated by the short message only if the remote computing device originating the short message is on the list of trusted remote computing devices.

6. The method of claim 1, wherein receiving the short message comprises receiving, with the OOB processor, a short message while the in-band processor is in a reduced-power operational state.

7. The method of claim 6, further comprising storing the short message and delaying execution of the at least one operation with the OOB processor until either the computing device is connected to the external power source or the in-band processor is booted from the reduced-power operational state by a user.

8. The method of claim 6, wherein executing at least one operation with the OOB processor comprises booting the in-band processor of the computing device from the reduced-power operational state to the full-power operational state.

9. The method of claim 1, wherein executing at least one operation with the OOB processor comprises initiating communications with a remote computing device.

10. The method of claim 1, wherein executing at least one operation with the OOB processor comprises transmitting an internet protocol (IP) address of the computing device.

11. A tangible, machine-readable medium comprising a plurality of instructions that, in response to being executed, result in a computing device:
receiving a short message with an out-of-band (OOB) processor of the computing device while an in-band processor of the computing device is in a reduced-power state, the short message being received over a wireless wide-area network (WWAN); and
determining whether the computing device is connected to an external power source in response to receiving the short message; and
executing at least one operation with the OOB processor indicated by the short message in response to determining that the computing device is connected to the external power source or in response to determining that the in-band processor has been booted from the reduced-power operational state by a user.

12. The tangible, machine-readable medium of claim 11, wherein receiving the short message comprises receiving a short message that originated from a remote computing device outside of a firewall protecting the computing device having the OOB processor.

13. The tangible, machine-readable medium of claim 12, wherein executing at least one operation with the OOB processor comprises establishing a secure connection, through the firewall, between the remote computing device and the computing device having the OOB processor.

14. The tangible, machine-readable medium of claim 12, wherein the plurality of instructions, in response to being executed, further result in the computing device:
establishing a list of trusted remote computing devices; and
executing at least one operation with the OOB processor in response to receiving the short message only if the remote computing device originating the short message is on the list of trusted remote computing devices.

15. The tangible, machine-readable medium of claim 11, wherein the plurality of instructions, in response to being executed, further result in the computing device storing the short message and delaying execution of the at least one operation with the OOB processor until either the computing device is connected to the external power source or the in-band processor is booted from the reduced-power operational state by a user.

16. The tangible, machine-readable medium of claim 11, wherein executing at least one operation with the OOB processor comprises booting the in-band processor of the computing device from the reduced-power operational state.

17. The tangible, machine-readable medium of claim 16, wherein executing at least one operation with the OOB processor further comprises initiating communications with a remote computing device.

18. The tangible, machine-readable medium of claim 16, wherein executing at least one operation with the OOB processor further comprises transmitting an internet protocol (IP) address of the computing device.

19. A computing device comprising:
an in-band processor;
a wireless transceiver configured for communications over a wireless wide-area network (WWAN); and
an out-of-band (OOB) processor capable of communicating over the WWAN using the wireless transceiver irrespective of an operational state of the in-band processor, the OOB processor configured to (i) determine whether the in-band processor is in a full-power operational state and whether the computing device is connected to an external power source in response to receiving a short message via the wireless transceiver and (ii) execute at least one operation indicated by the short message in response to determining that the in-band processor is in the full-power operational state or in response to determining that the computing device is connected to the external power source.

20. The computing device of claim 19, wherein the OOB processor is configured to boot the in-band processor from a reduced-power operational state to the full-power operational state in response to receiving the short message.

* * * * *